United States Patent

Schröder et al.

Patent Number: 5,826,312
Date of Patent: Oct. 27, 1998

[54] DEVICE FOR CONNECTING THE EDGE REGION OF A COVERING MATERIAL FOR VEHICLE SEAT UPHOLSTERY TO A MOUNTING

[75] Inventors: Wilhelm Schröder, St. Julian; Ralf Nolte, Enkenbach-Alsenborn; Wolfgang Pluta, Imsweiler, all of Germany

[73] Assignee: Lear Corporation, Southfield, Mich.

[21] Appl. No.: 959,510

[22] Filed: Oct. 28, 1997

[51] Int. Cl.⁶ .............................. A47C 31/02; B68G 7/12
[52] U.S. Cl. .......................... 24/601.2; 24/458; 24/532; 297/218.3; 297/218.5
[58] Field of Search .................... 24/601.2, 570, 24/532, 531, 458, 30.5 P, 265 A, 265 EC, 265 C, 67 P, 72.5, 72.7, 343; 297/218.3, 218.5

[56] References Cited

U.S. PATENT DOCUMENTS

| | | | |
|---|---|---|---|
| 3,670,369 | 6/1972 | McIlroy, II | 24/343 X |
| 4,525,899 | 7/1985 | Carroll | 24/67 P |
| 4,534,089 | 8/1985 | Swan | 24/30.5 P X |
| 5,497,537 | 3/1996 | Robinson et al. | 24/30.5 P X |
| 5,507,460 | 4/1996 | Schneider | 24/601.2 X |
| 5,605,373 | 2/1997 | Wildern, IV et al. | 297/218.3 X |

FOREIGN PATENT DOCUMENTS 4219656  12/1992  Germany .

*Primary Examiner*—James R. Brittain
*Assistant Examiner*—Robert J. Sandy
*Attorney, Agent, or Firm*—Brooks & Kushman P.C.

[57] ABSTRACT

A device is disclosed for connecting the edge region of a covering material (2) for vehicle seat upholstery to a mounting (3). Due to the fact that, according to the invention, a central piece (4), on one side of which means (5, 6) for making a connection with the mounting (3) are provided, one articulated zone (11) each along two opposite edges of the central piece (4), two side pieces (9, 10), which are pivotally connected to the central piece (4) via one or other articulated zone (11) and form arms of a clip which may be laid on one or the other side of the edge region, which is to be grasped, of the covering material (2), at least one spring-like snap-in element (12), which protrudes from the surface of the one arm (9') facing the other arm (10') and is capable of penetrating the covering material (2) and engaging in a snap-in aperture (13) of the other arm, a device is created by means of which the necessary connection between the covering material (2) and the mounting (3) can be realized at a more favorable cost.

13 Claims, 2 Drawing Sheets

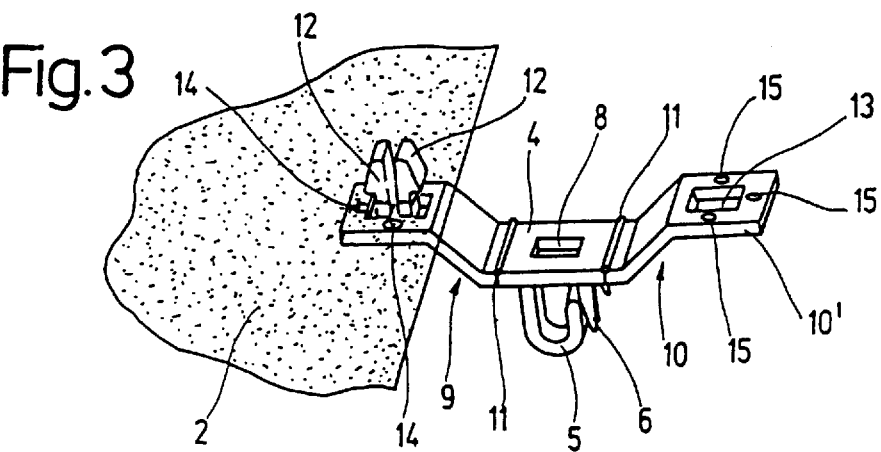
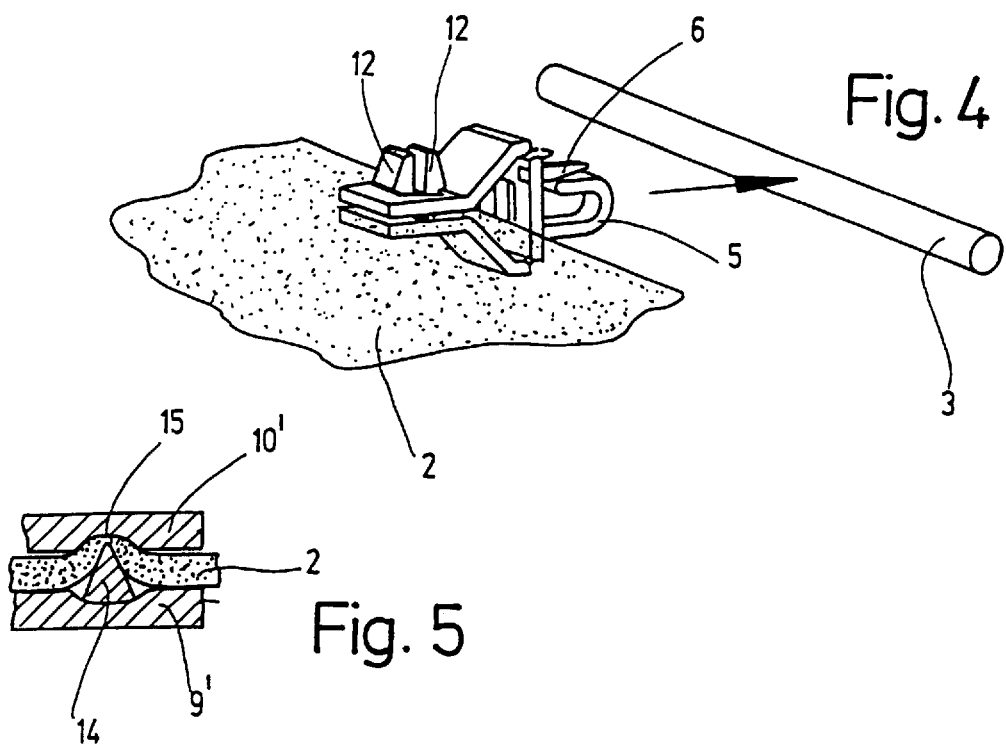
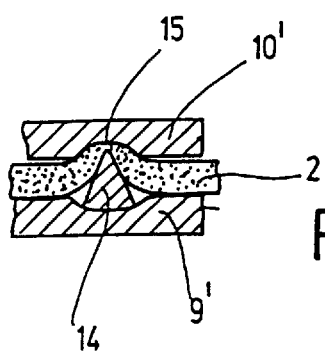
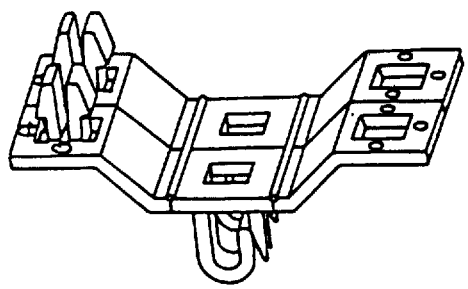

DEVICE FOR CONNECTING THE EDGE REGION OF A COVERING MATERIAL FOR VEHICLE SEAT UPHOLSTERY TO A MOUNTING

TECHNICAL FIELD

The invention relates to a device for connecting the edge region of a covering material for vehicle seat upholstery to a mounting.

BACKGROUND ART

In the known devices of this type, the connection with the covering material requires that a selvedge or strip made of cardboard or a hanging section should first be sewn on to the covering material. This noticeably increases production expenditure.

From the publication DE 42 19 656 C1, an affixing element for an upholstery covering material is known, which comprises an essentially V-shaped fixation clamp having an insert hook protruding beyond the apex of the V-shaped configuration and being open in a direction towards the apex. The insert hook receives the edge seam of the upholstery covering material into which a mounting wire is sewn in. Supporting flaps are integrally formed with the free ends of the arms of the affixing element. Also, barbs are integrally formed with these arms for the purpose of engaging the upholstery foam. This conventional affixing element involves high costs both in production and in mounting. Moreover, it cannot be excluded that the barbs escape inadvertently from the upholstery material.

SUMMARY OF THE INVENTION

The object underlying the invention is therefore to provide a device of the type mentioned above with which the necessary connection between the covering material and the mounting can be realized at a more favorable cost. A device comprising the features of claim 1 achieves this object.

The device according to the invention, which can be referred to as a clip, can be manufactured at a very favorable price and can in particular be clipped directly on to the covering material without any additional auxiliary means. The spring-like snap-in element pushes through the covering material with the result that the latter is not only securely clasped or clamped between the two arms of the clip but is also connected to the clip as a form-fit. Finally, the application of the clip to the covering material is also a simple operation because the two arms only need to be brought towards one another until the snap-in element latches into the snap-in-aperture.

In a preferred form of embodiment, the articulated zones between the central piece and the two side pieces are each formed by an integral or living hinge. By this means, any additional outlay for the clip is avoided.

The spring-like snap-in element preferably has the form of a tooth catch, the free end section of which, forming the tooth, has a cross-sectional profile tapering wedge-like towards the free end. This makes the penetration of the covering material easier.

Instead of just a single spring-like snap-in element, at least two such elements can also be provided. In a preferred form of embodiment, two tooth catches, configured the same but laterally reversed, are arranged beside one another with teeth pointing away from each other. In the latched state they grip behind opposite edges of the snap-in aperture.

To increase the retention force of these clips according to the invention, on at least one of the sides, facing one another, of the two arms, clasping or clamping elements can be provided in the region coming into contact with the covering material. For example, these clasping elements can be formed by projecting points or teeth. Depressions in the other arm can be associated with these clasping elements.

Particularly when a wire is provided as mounting, it is advantageous to configure the means of making a connection with the mounting in the form of a hook, in front of the mouth opening of which there is disposed a finger protruding from the central piece. This finger can, together with the hook, delimit a wedge-shaped slot tapering towards the central piece. A slot of this sort makes it easier to insert the wire without impairing the secure connection with same.

BRIEF DESCRIPTION OF THE DRAWINGS

The invention is described in detail below with references to preferred embodiments, given by way of example and shown in the drawings:

FIG. 3 shows the first embodiment in the open state but after the covering material has been pushed through by means of the tooth catches, FIG. 4 shows the first embodiment after the connection with the covering material has been made and before being connected to a wire or the like, FIG. 5 shows a detail from a longitudinal section, shown in enlargement, of the first embodiment according to FIG. 1, and FIG. 6 shows a view corresponding to FIG. 2 of a second embodiment.

BEST MODE FOR CARRYING OUT THE INVENTION

Figure 1:
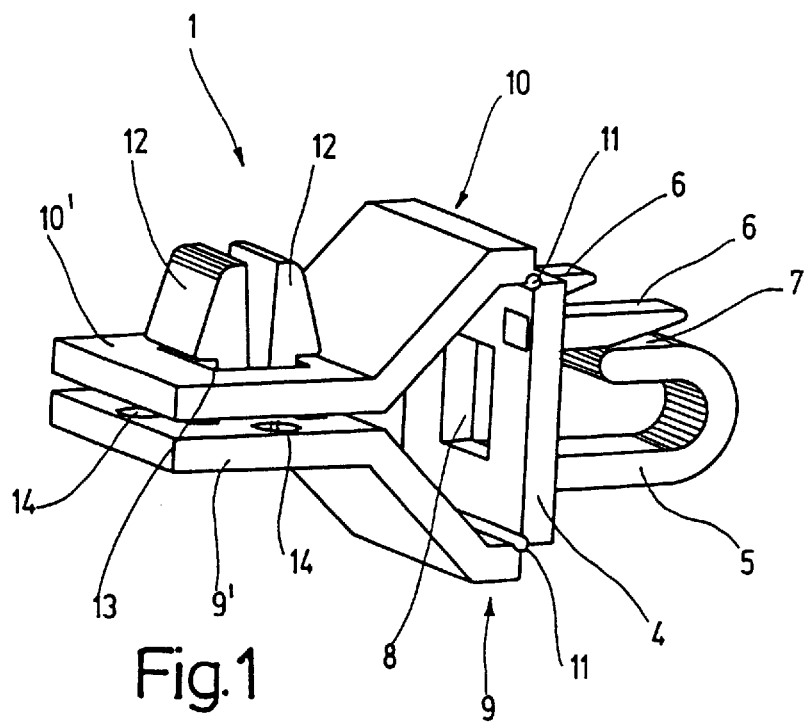
FIG. 1 shows a first embodiment according to the invention in the closed state.
Figure 2:
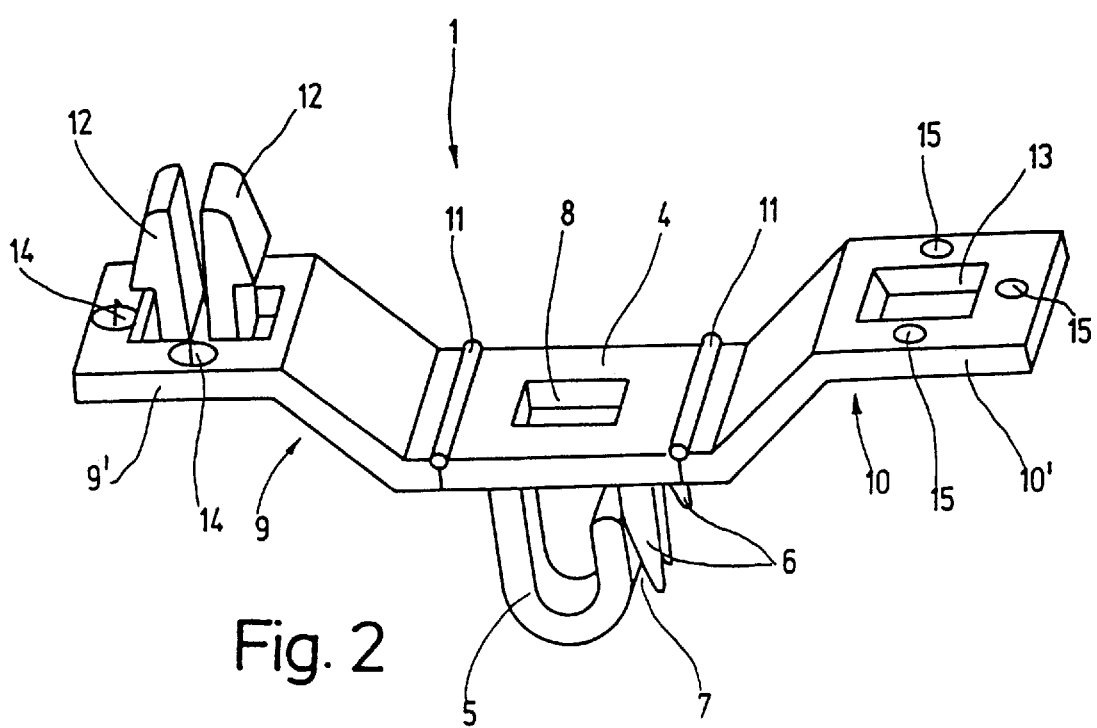
FIG. 2 shows the first embodiment according to the invention in the open state.

A clip, generally referred to as 1, for making a connection between the edge region of a covering material 2 for the upholstery of a vehicle seat and a mounting in the form of a long stretched-out element made of metal or plastic, for example a wire 3, is realized as an integral one-piece plastic part. It has a central piece 4 in the form of a flat rectangular plate from one side of which an integral hook 5 protrudes.

Beside the mouth of this hook 5 there are disposed two fingers 6 which protrude from the central piece 4 like the hook 5. Together with the free end section of the hook 5, which sections runs perpendicular to the central piece 4, the fingers 6 form, as a result of a wedge profile tapering towards the free end, a wedge-shaped gap 7, which becomes narrower towards the central piece 4.

The wedge-shaped gap 7 makes it easier to insert the wire 3 into the hook 5, the latter and the fingers 6 yielding resiliently. The rod-like elements, which form the hook 5 and the fingers 6, have a rectangular cross-section. For manufacturing reasons, the center of the central piece 4 is provided with a through aperture 8.

A first side piece 9 is connected to the one edge zone of the central piece 4 and a second side piece 10 is connected to the opposite edge zone, each via an integral hinge or living hinge 11 with the central piece 4. Each of the side pieces 9 and 10 has a narrow end zone adjacent to the integral hinge 11, opposite which end zone a central section in the form of a flat rectangular plate is angled. To the same extent, but in an opposite direction, there is angled a flat end plate 9' or 10' which joins on to the edge of the middle section 4 turned away from the end zone. To this extent, the two side pieces 9 and 10 are configured the same but laterally reversed or mirror-inverted.

The angles are, as shown in FIG. 3, chosen to be such that, when the two end plates 9' and 10' are adjacent to the one or other side of the covering material 2, i.e. assume a parallel position, the two middle sections form the two sides of an isosceles triangle.

From the surface of the end plate 9' in contact with the covering material in the effective state there protrude two tooth catches 12, configured the same but laterally reversed, which are designed to be capable of being directed outwards in a spring-like manner, reducing the distance between them. The tooth catch 12 which is closer to the middle section 4 forms a tooth projecting towards the middle section 4 and the other tooth catch 12 forms a tooth projecting in the opposite direction, both teeth forming a respective wedge tapering towards the free end of the tooth catch 12.

For interlocking the tooth catches 12 with the end plate 10', the latter is provided with a snap-in aperture 13 which is rectangular in cross-section and which is penetrated by the tooth catches 12 when the covering material 2 is fixed between the two end plates 9' and 10'. The teeth of the two tooth catches 12 then grip and engage behind the edge zones of the snap-in aperture 13 opposite one another.

Thanks to the wedge shape of the teeth of the tooth catches 12, these teeth can push through the covering material without difficulty and the material is thereby connected with the clip 1 as a form-fit.

To increase the retention force, clasping elements 14 are provided which in the embodiment, given by way of example, are all molded on to the end plate 9' carrying the tooth catches 12 and protrude from this plate in the same direction as the tooth catches 12. In the embodiment, the clasping elements 14 are configured as pyramids or teeth, as FIG. 4 shows. So that they do not push through the covering 2, but only direct it out, depressions 15 are provided in the end plate 10' which are each directed to one of the clasping elements 14. It will generally be expedient, first to connect the clip 1 to the covering material 2 and only then to attach the wire 3. In principle, however, the reverse procedure is also possible.

The clasping elements 12 can, of course, also be configured differently, as is likewise true of the tooth catches 12. All that needs to be ensured is that the corresponding elements can penetrate the covering material 2 and are capable of making a snap-in connection with the other end plate. Likewise, the hook 5 and the finger 6 can be replaced by other elements which make it possible to connect to the wire 3 or some other mounting.

The second embodiment, shown in FIG. 5, differs from the first embodiment only in that a clip according to the first embodiment lies beside an identically configured clip and is connected to the latter, for example formed as one piece. As far as detail is concerned, reference can therefore be made to the detailed disclosure given about the first embodiment.

What is advantageous is not only the simple production of the connection between the covering material 2 and a mount, for example the wire 3, with the assistance of the clip according to the invention, and its low manufacturing costs determined by its design as a one-piece plastic part. What is also a substantial advantage is the fact that the covering 2 can be adjusted. If, for example, the tensile force acting on the covering 2 is not sufficient, one only has to make the clip 1 grip somewhat further into the covering material 2.

What is claimed:

1. A device for connecting the edge region of a covering material for vehicle seat upholstery to a mounting, comprising:

a) a central piece on one side of which means provided for making a connection with the mounting, b) an articulated zone along each of two opposite edges of the central piece, c) two side pieces which are pivotally connected with the central piece via one or the other articulated zone and form arms of a clip which can be laid on the one or other side of the edge region of the covering material, which is to be grasped, and d) at least one spring-like snap-in element, which protrudes form the surface of the one arm facing the other arm and is capable of penetrating the covering material and engaging in a snap-in aperture of the other arm.

2. The device according to claim 1 wherein the articulated zones are each formed by one integral hinge or living hinge.

3. The device according to claim 1 wherein the central piece and the two side pieces each have the form of a plate.

4. The device according to claim 3 wherein the two side pieces each have a first section adjoining the articulated zone and a second section at an angle to the first section, and in that the two second sections lie parallel to one another in the position grasping the covering material, while the two first sections enclose an angle with one another.

5. The device according to claim 4 wherein the angle enclosed by the two first sections opens towards the central piece.

6. The device according to claim 1 wherein the spring-like snap-in element has the form of a tooth catch, a free end section of the tooth catch which, forming the tooth catch, has a cross-sectional profile tapering wedge-like towards the free end thereof.

7. The device according to claim 6 wherein two tooth catches, configured the same but laterally reversed, are arranged beside one another with teeth pointing away from each other and in the latched state grip behind facing edges of the snap-in aperture in the other arm.

8. The device according to claim 1 wherein on at least one of the sides, facing one another, of the two arms, clasping elements are provided in the region coming into contact with the covering material.

9. The device according to claim 8 wherein the clasping elements are formed by projecting points or teeth.

10. The device according to claim 8 wherein there is associated with each clasping element a depression in the other arm.

11. The device according to claim 1 wherein the means for making a connection with the mounting comprises at least one hook and a finger protruding from the central piece, the hook and the finger cooperating to form a gap.

12. The device according to claim 11 wherein the finger delimits with the hook a wedge-shaped slot tapering towards the central piece.

13. The device according to claim 1 wherein the device comprises plastic and is integrally configured as one piece.

* * * * *